United States Patent
Ulvenlund et al.

(10) Patent No.: US 12,540,344 B2
(45) Date of Patent: Feb. 3, 2026

(54) SURFACTANT PREPARATION PROCESS

(71) Applicants: Enza Biotech AB, Lund (SE); Croda International Plc, Goole (GB)

(72) Inventors: Stefan Ulvenlund, Lund (SE); Maria Andersson, Lund (SE); Maria Viloria Cols, Lund (SE); Nikolina Barchan, Lund (SE); Christian Wells, Goole (GB); Johan Sander, Lund (SE); Magdalena Axenstrand, Lund (SE)

(73) Assignees: Enza Biotech AB, Lund (SE); Croda International PLC, Goole (GB)

( * ) Notice: Subject to any disclaimer, the term of this patent is extended or adjusted under 35 U.S.C. 154(b) by 505 days.

(21) Appl. No.: 18/010,371

(22) PCT Filed: Jun. 18, 2021

(86) PCT No.: PCT/EP2021/066619
§ 371 (c)(1),
(2) Date: Dec. 14, 2022

(87) PCT Pub. No.: WO2021/255243
PCT Pub. Date: Dec. 23, 2021

(65) Prior Publication Data
US 2023/0227877 A1    Jul. 20, 2023

(30) Foreign Application Priority Data
Jun. 19, 2020 (GB) .................... 2009388

(51) Int. Cl.
C12P 19/02 (2006.01)
A61K 9/08 (2006.01)
A61K 47/26 (2006.01)
C12N 9/10 (2006.01)

(52) U.S. Cl.
CPC .......... *C12P 19/02* (2013.01); *A61K 9/08* (2013.01); *A61K 47/26* (2013.01); *C12N 9/1074* (2013.01); *C12Y 204/01019* (2013.01)

(58) Field of Classification Search
None
See application file for complete search history.

(56) References Cited

U.S. PATENT DOCUMENTS 5,266,690 A    11/1993  McCurry et al.
5,756,072 A *   5/1998  Beck ................. C11D 1/662
                                                 536/124
5,962,399 A * 10/1999  Wulff ................ C07H 15/04
                                                 536/120

FOREIGN PATENT DOCUMENTS

FR         2918270 A1  *  1/2009  ............ A61K 8/604
WO  WO-2015047188 A1  *  4/2015  ............... A61K 8/06

OTHER PUBLICATIONS

Foley, P. et al. 2012. Derivation and synthesis of renewable surfactants. Chemical Society Reviews 41: 1499-1518; specif. p. 1505 (Year: 2012).*
EngMT-Boucher, C. Stable, hundred percent natural emulsion composition . . . obtained from surfactant of alkyl polyglucoside, polysaccharide, fatty body and water. French Patent Application Publication No. FR2918270A1; Date of Pub.: Jan. 9, 2009; pp. 1-5; specif. pp. Abstract, 2, 3, 4 (Year: 2009).*
Aisyah, S. et al. 2010. The production of alkyl polyglycoside (APG) surfactant and its application in liquid hand soap. Journal of Agroindustrial Technology 20(2): 159-165; specif. p. 159 (Year: 2010).*
International Search Report and Written Opinion for International Application No. PCT/EP2021/066619, dated Oct. 13, 2021, 12 pages.
International Search Report and Written Opinion for International Application No. PCT/EP2021/066631, dated Oct. 12, 2021, 11 pages.
Svensson et al., "Efficient Synthesis of a Long Carbohydrate Chain Alkyl Glycoside Catalyzed by Cyclodextrin Glycosyltransferase (CGTase)", Biotechnology & Bioengineering, vol. 104, No. 5, Dec. 1, 2009, pp. 854-861.
Svensson, D., "Enzymatic Synthesis of Alkyl Glycosides. New Applications for Glycoside Hydrolases", Doctoral Thesis, Lund University, SE, Sep. 2009, 182 pages.
Svensson et al., "Immobilisation of CGTase for continuous production of long-carbohydrate-chain alkyl glycosides, Control of product distribution by flow rate adjustment", Journal of Molecular Catalysis B: Enzymatic 69, 2011, pp. 147-153.

* cited by examiner

*Primary Examiner* — Adam Weidner
*Assistant Examiner* — Sharon M. Papciak
(74) *Attorney, Agent, or Firm* — Buchanan Ingersoll & Rooney PC

(57) ABSTRACT

An enzymatic process for the preparation of C16 alkyl polyglycosides and/or C18 alkyl polyglycosides by reacting C16 alkyl glycoside and/or C18 alkyl glycoside with a glycosyl donor containing monosaccharide residues to form an alkyl polyglycoside intermediate which can be fractionated to form an alkyl polyglycoside product, wherein the mole-average degree of polymerization mean DP) of the glycoside chains is greater than or equal to 3.0 units and the molar concentration of alkyl triglycoside (DP3) is greater than alkyl monoglycoside (DPI). The C16/C18 alkyl polyglycoside product is particularly useful in health care formulations, especially in combination with and/or as a solubilizer for active pharmaceutical ingredients (APIs).

5 Claims, No Drawings

SURFACTANT PREPARATION PROCESS

CROSS-REFERENCE TO RELATED APPLICATIONS

This application is the U.S. National Phase of PCT/EP2021/066619, filed Jun. 18, 2021, which claims the benefit of United Kingdom Application No. 2009388.6, filed Jun. 19, 2020, both of which are incorporated by reference herein in their entireties for all purposes.

FIELD OF INVENTION

The present invention relates to a process for the preparation of alkyl polyglycosides by an enzyme reaction, alkyl polyglycoside compositions per se and use thereof.

BACKGROUND

Alkyl glycoside, particularly alkyl polyglycoside, and especially alkyl polyglucoside, non-ionic surfactants have been widely used in a range of cosmetic, household, health care and industrial applications. Existing commercially available alkyl polyglucosides are produced by a chemical route. Methods of producing alkyl polyglycosides by use of an enzyme reaction have been disclosed in the literature, but at present no suitable commercially viable method exists for the enzymatic synthesis of alkyl polyglycosides such as alkyl polyglucosides. There is a need to improve the efficiency and/or yield of the enzyme reaction.

Commercially available alkyl polyglycosides are complex mixtures of molecules wherein the mean length of the polyglycoside chain is short, despite being commonly referred to as "poly", varying from about 1 to 1.5 glycoside units, preferably glucose units, per alkyl chain. This limits the usefulness of the surfactants and there is a need for alkyl polyglycosides, particularly alkyl polyglucosides, with longer glycoside/glucoside chains and/or to be able to vary the distribution of the glycoside chains in the composition to modify/improve the surfactant properties of the alkyl polyglycoside. Some of these properties are difficult to achieve using chemical synthesis methods.

There is also a need, particularly in pharmaceutical applications, for alkyl polyglycosides to have improved transparency in aqueous media, and/or improved solubilization and/or stability of materials, particularly of active pharmaceutical ingredients (APIs).

SUMMARY OF THE INVENTION

We have surprisingly discovered a process of preparing alkyl polyglycosides by an enzyme reaction, subsequent purification/fractionation thereof, alkyl polyglycoside compositions per se and use thereof, which overcomes or significantly reduces at least one of the aforementioned problems.

Accordingly, the present invention provides a process for the preparation of C16 alkyl polyglycosides and/or C18 alkyl polyglycosides by (a) enzymatically reacting C16 alkyl glycoside and/or C18 alkyl glycoside with a glycosyl donor comprising monosaccharide residues to form an alkyl polyglycoside intermediate, wherein the mole-average degree of polymerization (mean DP) of the glycoside chains is greater than or equal to 2.0 units and the molar concentration of alkyl monoglycoside (DP1) is greater than alkyl triglycoside (DP3); and (b) fractionating the alkyl polyglycoside intermediate to form (i) an alkyl polyglycoside product, wherein the mean DP of the glycoside chains is greater than or equal to 3.0 units and the molar concentration of DP3 is greater than DP1, and optionally (ii) an alkyl polyglycoside side-product, wherein the mean DP of the glycoside chains is less than or equal to 2.5 units.

The invention further provides a process for the preparation of C16 alkyl polyglycosides and/or C18 alkyl polyglycosides by;
(a) reacting with an enzyme;
(i) a glycosyl donor comprising monosaccharide residues; and
(ii) an alkyl glycoside of the formula $R_m$-$G_n$, wherein
R is an alkyl group comprising m carbon atoms, m is 16 and/or 18,
G is at least one monosaccharide residue,
n is the number of monosaccharide residues,
to form;
(iii) an alkyl polyglycoside intermediate of the formula $R_m$-$G_p$,
wherein
R is an alkyl group comprising m carbon atoms, m is 16 and/or 18,
G is at least one monosaccharide residue,
p is the number of monosaccharide residues, and the mean value of p is greater than or equal to 2.0,
p=(n+q) wherein n is the number of monosaccharide residues in the alkyl glycoside, and q is the increase in the number of monosaccharide residues that occurs during the enzyme reaction, and
the mean value of q is greater than or equal to 1.0; and
(b) fractionating the alkyl polyglycoside intermediate to form an alkyl polyglycoside product of the formula $R_m$-$G_s$,
wherein
R is alkyl group comprising m carbon atoms, m is 16 and/or 18,
G is at least one monosaccharide residue,
s is the number of monosaccharide residues, and the mean value of s is greater than or equal to 3.0,
s=(p+t) wherein p is the number of monosaccharide residues in the alkyl polyglycoside intermediate, and t is the increase in the number of monosaccharide residues that occurs during the fractionation, and
the mean value of t is greater than or equal to 0.3.

The invention also provides a process for the preparation of C16 and/or C18 alkyl polyglycoside intermediate by reacting with an enzyme a C16 alkyl glycoside and/or a C18 alkyl glycoside with a glycosyl donor comprising monosaccharide residues form the alkyl polyglycoside intermediate, wherein the mole-average degree of polymerization (mean DP) of the glycoside chains is greater than or equal to 2.0 units.

The invention also further provides an alkyl polyglycoside composition comprising C16 alkyl polyglycosides and/or C18 alkyl polyglycosides wherein the mole-average degree of polymerization (mean DP) of the glycoside chains is greater than or equal to 3.0 units and the molar concentration of alkyl triglycoside (DP3) is greater than alkyl monoglycoside (DP1).

The invention yet further provides a clear composition comprising (i) 0.001 to 10.0 wt %, of at least one water insoluble material, solubilized by (ii) 0.01 to 75.0 wt % of alkyl polyglycoside comprising C16 alkyl polyglycosides and/or C18 alkyl polyglycosides wherein the mole-average degree of polymerization (mean DP) of the glycoside chains is greater than or equal to 3.5 units and the molar concentration of alkyl triglycoside (DP3) is greater than alkyl monoglycoside (DP1), and (iii) 15.0 to 99.99 wt % of water.

The invention still further provides a pharmaceutical composition comprising (i) 0.001 to 10.0 wt %, of at least one active pharmaceutical ingredient (API), (ii) 0.01 to 75.0 wt % of alkyl polyglycoside comprising C16 alkyl polyglycosides and/or C18 alkyl polyglycosides wherein the mole-average degree of polymerization (mean DP) of the glycoside chains is greater than or equal to 3.0 units and the molar concentration of alkyl triglycoside (DP3) is greater than alkyl monoglycoside (DP1), and (iii) 15.0 to 99.99 wt % of water.

The invention even further provides a method of solubilizing a material, in which the material is mixed with an aqueous solution of 0.01 to 75.0 wt % of alkyl polyglycoside comprising C16 alkyl polyglycosides and/or C18 alkyl polyglycosides wherein the mole-average degree of polymerization (mean DP) of the glycoside chains is greater than or equal to 3.0 units and the molar concentration of alkyl triglycoside (DP3) is greater than alkyl monoglycoside (DP1), and the mixture is agitated at 10° C. to 100° C. to obtain a solubilized material.

The invention yet even further provides the use of an alkyl polyglycoside composition comprising C16 alkyl polyglycosides and/or C18 alkyl polyglycosides wherein the mole-average degree of polymerization (mean DP) of the glycoside chains is greater than or equal to 3.0 units and the molar concentration of alkyl triglycoside (DP3) is greater than alkyl monoglycoside (DP1), to solubilize and/or to stabilise an active pharmaceutical ingredient (API).

The invention additionally provides the use of an alkyl polyglycoside composition comprising C16 alkyl polyglycosides and/or C18 alkyl polyglycosides wherein the mole-average degree of polymerization (mean DP) of the glycoside chains is greater than or equal to 3.0 units and the molar concentration of alkyl triglycoside (DP3) is greater than alkyl monoglycoside (DP1), to partially or completely replace polysorbate 80 in a pharmaceutical composition comprising an active pharmaceutical ingredient (API).

The invention also additionally provides an alkyl polyglycoside composition comprising C16 alkyl polyglycosides and/or C18 alkyl polyglycosides wherein the mole-average degree of polymerization (mean DP) of the glycoside chains is 1.2 to 2.5 units and the mole fraction of alkyl triglycoside (DP3) is less than or equal to 0.20.

The invention further additionally provides the use of an alkyl polyglycoside composition comprising C16 alkyl polyglycosides and/or C18 alkyl polyglycosides wherein mole-average degree of polymerization (mean DP) of the glycoside chains is 1.2 to 2.5 units and the mole fraction of alkyl triglycoside (DP3) is less than or equal to 0.20, as an emulsifier, wetting agent and/or dispersing agent.

The alkyl glycoside starting material for use in the process of the present invention may be an alkyl monoglycoside, an alkyl diglycoside, an alkyl oligoglycoside and/or an alkyl polyglycoside. The glycoside component of the alkyl glycoside is suitably a monosaccharide residue, e.g. of glucose, fructose, mannose, galactose, arabinose, and mixtures thereof, and/or one or more of these monosaccharide residues joined by glycosidic linkages, e.g. to form disaccharide, oligosaccharide and/or polysaccharide chains. The monosaccharide residues suitably comprise, consist essentially of, or consist of glucose residues. Thus, preferred starting materials are alkyl glucosides selected from the group consisting of an alkyl monoglucoside, an alkyl diglucoside, an alkyl oligoglucoside, an alkyl polyglucoside, and mixtures thereof, more preferably from an alkyl monoglucoside, an alkyl diglucoside, an alkyl oligoglucoside, and mixtures thereof, and particularly from an alkyl monoglucoside and an alkyl diglucoside, for example an alkyl maltoside, and mixtures thereof.

In one embodiment, the alkyl glycoside starting material will be a composition containing a mixture of compounds, e.g. comprising different alkyl and/or glycoside chains. Commercially available alkyl glycosides, preferably alkyl glucosides, may be used as starting materials. Some commercially available mixtures of alkyl glycosides are generally referred to as alkyl polyglycosides or alkyl polyglucosides even though the mean length or mole-average degree of polymerization (mean DP) of the glycoside/glucoside chains will generally be less than 1.5 units.

For the avoidance of doubt, the use of the terms "alkyl glycosides" and "alkyl glucosides" herein shall generally refer to the starting materials for the enzyme reaction, unless otherwise clear from the context. The products, i.e. compositions or mixtures, resulting from the enzyme reaction shall be referred to herein as "alkyl polyglycosides" and/or "alkyl polyglucosides".

The alkyl chain of the alkyl glycoside, preferably alkyl glucoside, may be linear or branched, preferably comprises, consists essentially of, or consists of linear chains. The length or number of carbon atoms in the alkyl chain preferably comprises, consists essentially of, or consists of C16 and/or C18, and more preferably C16 and C18.

In one embodiment, the alkyl chain of the alkyl glycoside comprises a mixture of C16 and C18 alkyl groups, wherein the molar ratio of C16:C18 alkyl groups is suitably in the range from 0.3 to 3.0:1.0, preferably 0.5 to 2.0:1.0, more preferably 0.7 to 1.5:1.0, particularly 0.8 to 1.2:1.0, and especially 0.9 to 1.1:1.0.

In one embodiment, the alkyl glycoside may be solely in the α-anomer or β-anomer form, but may comprise both anomers, suitably having an α:β anomer ratio in the range from 0.2 to 20.0:1.0, preferably 1.0 to 10.0:1.0, more preferably 1.5 to 5.0:1.0, particularly 1.8 to 3.5:1.0, and especially 2.0 to 3.0:1.0.

In one embodiment, the alkyl glycoside comprises, consists essentially of, or consists of an alkyl monoglycoside and/or an alkyl diglycoside, preferably alkyl monoglucoside and/or alkyl diglucoside, particularly C16 and/or C18 alkyl glucosides, and especially C16 and C18 alkyl glucosides.

In one embodiment, the alkyl glycoside, suitably alkyl glucoside, comprises a mixture of compounds wherein the mean DP of the glycoside chain is in the range from 1.0 to 1.7, suitably 1.0 to 1.5, more preferably 1.0 to 1.3, particularly 1.0 to 1.15, and especially 1.0 to 1.1 glycoside units, preferably glucose units, per alkyl chain.

The alkyl glycoside starting material can be represented by the formula $R_m$-$G_n$, wherein
  R is an alkyl group comprising m carbon atoms, both defined herein,
  G is at least one monosaccharide residue, defined herein,
  n is the number of monosaccharide residues, and the mean value of n is defined herein (mean DP).

The glycosyl donor starting material is suitably a cyclic, linear or branched oligosaccharide or polysaccharide, or mixture thereof. The glycosyl donor may comprise a cyclic carbohydrate, i.e. a carbohydrate in which the chain of monosaccharide residues forms a closed loop (such as α-, β-, γ-cyclodextrin or larger cyclic alpha-glucans), linear oligosaccharides, such as maltodextrin, and polysaccharides, such as starch etc.

In one preferred embodiment, the glycosyl donor is selected from the group consisting of maltodextrin, cyclodextrin, starch and mixtures thereof; preferably maltodextrin, cyclodextrin and mixtures thereof; and more preferably cyclodextrin.

In one embodiment, the glycosyl donor comprises, consists essentially of, or consists of starch, particularly waxy starch. The starch may be derived from any vegetable source, e,g. corn, wheat, maize, barley, potato, tapioca, rice, sago, and sorghum grain. Crude starch materials such as ground cereals, macerated tubers, or the partially purified starches therefrom may be used. The term "starch" used herein encompasses unmodified starch as well as starch that has been modified by treatment with acids, alkalies, enzymes, heat, etc. Soluble or partially soluble modified starches, dextrins, pregelatinized products and starch derivatives of different types may also be used as glycosyl donor. Waxy (i.e. high in amylopectin) starch is preferred, such as those selected from the group consisting of potato amylopectin, maize amylopectin, waxy maize starch, waxy barley starch, waxy potato starch, and mixtures thereof.

In one embodiment, the glycosyl donor comprises, consists essentially of, or consists of maltodextrin. The maltodextrin may be derived from any vegetable source, such as potato, maize and wheat. Potato maltodextrin is one preferred form.

In one embodiment, the dextrose equivalent (DE) value of the maltodextrin is suitably in the range from 0.1 to 20, preferably 0.5 to 10, more preferably 0.8 to 5, particularly 0.9 to 2, and especially 1 to 1.5 units.

In one embodiment, the glycosyl donor comprises, consists essentially of, or consists of α-, β-, and/or γ-cyclodextrin, preferably α- and/or β-cyclodextrin, more preferably β-cyclodextrin.

The enzyme used in the process of the present invention is capable of transferring at least one, preferably at least two, monosaccharide residues at a time from the glycosyl donor to the alkyl glycoside. The enzyme is preferably a glycoside (or glycosyl) hydrolase and/or glycoside transferase.

In one embodiment, the enzyme is a glycoside hydrolase or a glycosyl transferase, preferably a glycoside hydrolase, particularly belonging to glycoside hydrolase family 13 or 57. One preferred glycoside hydrolase family 13 enzyme is cyclodextrin glycosyltransferase, which is also known as cyclodextrin glucanotransferase or cyclodextrin glucanyltransferase or cyclodextrin glycosyltransferase (all abbreviated to CGTase). One preferred CGTase enzyme is a cyclomaltodextrin glucanotransferase (EC number 2.4.1.19) ((I-4)-alpha-D-glucan: (I-4)-alpha-D-glucan 4-alpha-D[(I-4)-alpha-D-glucano]-transferase). Suitable enzymes include *Bacillus macerans* CGTase (Amano Enzyme Europe, U.K.) and *Thermoanaerobacter* sp. CGTase (Novozymes AJS, Denmark).

Other suitable glycoside hydrolase enzymes classified under family 13 and family 57, include 4-alpha-glucanotranserase, E. C. number 2.4.1.25; systematic name: (I-4)-alpha-D-glucan: (I-4)-alpha-D-glucan 4-alpha-D-glycosyl transferase (GTase).

In addition, glycosyl hydrolases belonging to other families or glycosyl transferases can be used in the process of the invention provided that they can transfer at least one, preferably at least two, monosaccharide residue at a time from the glycosyl donor to the alkyl glycoside as described herein.

In one embodiment, the monosaccharide residues present in the glycosyl donor are preferably in molar excess compared to the alkyl glycoside in the reaction mixture of the process of the present invention.

In one embodiment, the molar ratio of monosaccharide residues present in the glycosyl donor, preferably maltodextrin, to alkyl glycoside in the reaction mixture is (i) greater than 40:1.0, suitably greater than or equal to 50:1.0, preferably greater than or equal to 55:1.0, more preferably greater than or equal to 60:1.0, particularly greater than or equal to 65:1.0, and especially greater than or equal to 70:1.0; and/or (ii) suitably less than or equal to 200:1.0, preferably less than or equal to 150:1.0, more preferably less than or equal to 120:1.0, particularly less than or equal to 90:1.0, and especially less than or equal to 80:1.0.

In one embodiment, the molar ratio of monosaccharide residues present in the glycosyl donor, preferably maltodextrin, to alkyl glycoside in the reaction mixture is suitably in the range from 49 to 95:1.0, preferably 56 to 88:1.0, more preferably 62 to 82:1.0, particularly 67 to 77:1.0, and especially 71 to 73:1.0.

In one embodiment, the molar ratio of monosaccharide residues present in the glycosyl donor, preferably cyclodextrin, to alkyl glycoside in the reaction mixture is (i) suitably greater than 2.0:1.0, preferably greater than or equal to 3.0:1.0, more preferably greater than or equal to 4.0:1.0, particularly greater than or equal to 4.5:1.0, and especially greater than or equal to 5.0:1.0; and/or (ii) suitably less than 30.0:1.0, preferably less than or equal to 25.0:1.0, more preferably less than or equal to 20.0:1.0, particularly less than or equal to 17.0:1.0, and especially less than or equal to 15.0:1.0.

In one embodiment, the molar ratio of monosaccharide residues present in the glycosyl donor, preferably cyclodextrin, to alkyl glycoside in the reaction mixture is suitably in the range from 10.0 to 23.0:1.0, preferably 12.0 to 21.0:1, more preferably 14.0 to 20.0:1.0, particularly 16.0 to 19.0:1.0, and especially 17.0 to 18.0:1.0.

In one embodiment, the weight ratio of glycosyl donor, preferably maltodextrin, to alkyl glycoside in the reaction mixture, i.e. used in the process of the present invention is suitably in the range from 5 to 70:1.0, preferably 10 to 55:1.0, more preferably 15 to 45:1.0, particularly 20 to 35:1.0, and especially to 25 to 30:1.0.

In one embodiment, the weight ratio of glycosyl donor, preferably cyclodextrin, to alkyl glycoside in the reaction mixture, i.e. used in the process of the present invention is suitably in the range from 2.0 to 12.0:1.0, preferably 3.5 to 9.0:1.0, more preferably 4.5 to 7.5:1.0, particularly 5.0 to 7.0:1.0, and especially to 5.5 to 6.5:1.0.

In one embodiment, the concentration of alkyl glycoside in the reaction mixture, preferably when maltodextrin is the glycosyl donor, is (i) suitably greater than or equal to 0.20 wt %, preferably greater than or equal to 0.40 wt %, more preferably greater than or equal to 0.60 wt %, particularly greater than or equal to 0.65 wt %, and especially greater than or equal to 0.70 wt %; and/or (ii) suitably less than or equal to 6.0 wt %, preferably less than or equal to 3.0 wt %, more preferably less than or equal to 1.5 wt %, particularly less than or equal to 1.0 wt %, and especially less than or equal to 0.75 wt %, both based on the total weight of the mixture.

In one embodiment, the concentration of alkyl glycoside in the reaction mixture, preferably when cyclodextrin is the glycosyl donor, is (i) suitably greater than or equal to 1.3 wt %, preferably greater than or equal to 1.6 wt %, more preferably greater than or equal to 1.8 wt %, particularly greater than or equal to 2.0 wt %, and especially greater than or equal to 2.1 wt %; and/or (ii) suitably less than or equal to 3.0 wt %, preferably less than or equal to 2.8 wt %, more preferably less than or equal to 2.6 wt %, particularly less than or equal to 2.4 wt %, and especially less than or equal to 2.3 wt %, both based on the total weight of the mixture.

In one embodiment, the concentration of glycosyl donor in the reaction mixture, preferably maltodextrin, is suitably in the range from 5.0 to 35.0 wt %, preferably 10.0 to 30.0 wt %, more preferably 15.0 to 26.0 wt %, particularly 18.0 to 23.0 wt %, and especially 19.5 to 21.5 wt %, based on the total weight of the mixture.

In one embodiment, the concentration of glycosyl donor in the reaction mixture, preferably cyclodextrin, is suitably in the range from 9.0 to 20.0 wt %, preferably 11.0 to 18.0 wt %, more preferably 13.0 to 16.5 wt %, particularly 14.0 to 15.5 wt %, and especially 14.5 to 15.0 wt %, based on the total weight of the mixture.

The amount of water in the reaction mixture is suitably in the range from 60.0 to 95.0 wt %, preferably 65.0 to 90.0 wt %, more preferably 70.0 to 87.0 wt %, particularly 75.0 to 84.0 wt %, and especially 78.0 to 82.0 wt %, based on the total weight of the mixture.

In one embodiment, the concentration of enzyme in the reaction mixture is suitably in the range from 0.005 to 2.0 wt %, preferably 0.01 to 1.0 wt %, more preferably 0.03 to 0.10 wt %, particularly 0.04 to 0.06 wt %, and especially 0.05 wt %, based on the total weight of the mixture.

In one embodiment, the activity of the enzyme per kg of reaction mixture is suitably in the range from 0.15 to 60, preferably 0.3 to 30, more preferably 0.9 to 3.0, particularly 1.2 to 1.8, and especially 1.4 to 1.6 KNU-CP.

In one embodiment, the process of the present invention, preferably when maltodextrin is the glycosyl donor, is suitably carried out at a temperature in the range from 40 to 80° C., preferably 50 to 74° C., more preferably 55 to 71° C., particularly 60 to 69° C., and especially 63 to 67° C.

In one embodiment, the process of the present invention, preferably when cyclodextrin, particularly β-cyclodextrin, is the glycosyl donor, is suitably carried out at a temperature in the range from 65 to 85° C., preferably 70 to 80° C., more preferably 72 to 78° C., particularly 74 to 76° C., and especially 75° C.

In one embodiment, the enzyme reaction preferably occurs at a pH in the range from 5.0 to 9.0, more preferably 6.0 to 8.5, particularly 7.5 to 8.3, and especially 7.9 to 8.1.

The enzyme reaction suitably occurs over a time period in the range from 1 to 72, preferably 4 to 48, more preferably 8 to 42, particularly 12 to 36, and especially 16 to 32 hours. The enzyme reaction is suitably stopped after this time period by inactivation of the enzyme, for example, by heat, or by addition of acid, base or other agents. or by removal of the enzyme from the reaction mixture. In one embodiment, the enzyme is inactivated by heating the reaction mixture up to 100° C., suitably to 70° C., preferably to 80° C., more preferably to 85° C., particularly to 90° C., and especially to 95° C. for a suitable time period, e.g. for up to 2 hours, preferably up to 3 hours.

In one embodiment, the level of glycoside, preferably glucose, units conversion or amount of monosaccharide residues present in the glycosyl donor, preferably maltodextrin, transferred to the alkyl glycoside starting material during the enzyme reaction is (i) suitably greater than or equal to 1.0 wt %, preferably greater than or equal to 2.0 wt %, more preferably greater than or equal to 3.0 wt %, particularly greater than or equal to 4.0 wt %, and especially greater than or equal to 4.5 wt %; and/or (ii) suitably less than or equal to 10.0 wt %, preferably less than or equal to 8.0 wt %, more preferably less than or equal to 6.5 wt %, particularly less than or equal to 5.5 wt %, and especially less than or equal to 5.0 wt %, both based on the weight of monosaccharide residues originally present in the glycosyl donor starting material.

In one embodiment, the level of glycoside, preferably glucose, units conversion or amount of monosaccharide residues present in the glycosyl donor, preferably cyclodextrin, transferred to the alkyl glycoside starting material during the enzyme reaction is (i) suitably greater than or equal to 5.0 wt %, preferably greater than or equal to 10.0 wt %, more preferably greater than or equal to 12.0 wt %, particularly greater than or equal to 14.0 wt %, and especially greater than or equal to 16.0 wt %; and/or (ii) suitably less than or equal to 35.0 wt %, preferably less than or equal to 30.0 wt %, more preferably less than or equal to 25.0 wt %, particularly less than or equal to 20.0 wt %, and especially less than or equal to 18.0 wt %, both based on the weight of monosaccharide residues originally present in the glycosyl donor starting material.

In one embodiment, the concentration of alkyl polyglycoside in the crude reaction product mixture, i.e. before any purification or separation steps, is suitably in the range from 0.2 to 12.0 wt %, preferably 1.0 to 8.0 wt %, more preferably 1.2 to 7.0 wt %, particularly 1.4 to 6.0 wt %, and especially 1.5 to 5.5 wt %, based on the total weight of the mixture.

In one embodiment, preferably when maltodextrin is the glycosyl donor, the concentration of alkyl polyglycoside in the crude reaction product mixture is suitably in the range from 0.2 to 5.0 wt %, preferably 1.0 to 2.5 wt %, more preferably 1.2 to 2.0 wt %, particularly 1.4 to 1.8 wt %, and especially 1.5 to 1.7 wt %, based on the total weight of the mixture.

In one embodiment, preferably when cyclodextrin is the glycosyl donor, the concentration of alkyl polyglycoside in the crude reaction product mixture is suitably in the range from 2.0 to 12.0 wt %, preferably 3.0 to 9.0 wt %, more preferably 3.5 to 6.5 wt %, particularly 3.8 to 5.0 wt %, and especially 4.2 to 4.7 wt %, based on the total weight of the mixture.

The alkyl polyglycoside in the crude reaction product mixture, i.e. before any downstream fractionation is an intermediate product and will be referred to herein as the alkyl polyglycoside intermediate.

The ratio by weight of alkyl polyglycoside intermediate to alkyl glycoside starting material in the enzyme reaction according to the present invention is suitably in the range from 1.2 to 4.0:1.0, preferably 1.5 to 3.0:1.0, more preferably 1.7 to 2.6:1.0, particularly 1.9 to 2.4:1.0, and especially 2.0 to 2.3:1.0.

The alkyl chain component of the alkyl polyglycoside intermediate suitably reflects/essentially is the same as the alkyl chain component of the alkyl glycoside starting material as defined herein. In one embodiment, the alkyl chain of the alkyl polyglycoside intermediate comprises a mixture of C16 and C18 alkyl groups, wherein the molar ratio of C16:C18 alkyl groups is suitably in the range from 0.3 to 3.0:1.0, preferably 0.5 to 2.0:1.0, more preferably 0.7 to 1.5:1.0, particularly 0.8 to 1.2:1.0, and especially 0.9 to 1.1:1.0.

The chemical composition of glycoside component in the alkyl polyglycoside intermediate will depend upon the chemical composition of both the alkyl glycoside and the glycosyl donor. In one embodiment, the chemical composition of the glycoside component of the alkyl glycoside and glycosyl donor are the same, preferably both comprising, consisting essentially of, or consisting of glucose residues. Thus, the chemical composition of glycoside component of the alkyl polyglycoside intermediate preferably comprises, consists essentially of, or consists of glucose residues.

The mean length or mole-average degree of polymerization (mean DP) of the glycoside chain of the alkyl polyglycoside, preferably alkyl polyglucoside, intermediate is (i) suitably greater than or equal to 2.0, more suitably greater than or equal to 2.5, preferably greater than or equal to 3.0, more preferably greater than or equal to 3.5, particularly greater than or equal to 3.8, and especially greater than or equal to 4.0 glycoside units, preferably glucose units; and/or (ii) suitably less than or equal to 6.5, more suitably less than or equal to 6.0, preferably less than or equal to 5.5, more preferably less than or equal to 5.0, particularly less than or equal to 4.8, and especially less than or equal to 4.6 glycoside units, preferably glucose units, i.e. per alkyl chain.

In one embodiment, the mean DP of the glycoside chain of the alkyl polyglycoside intermediate, preferably when maltodextrin is the glycosyl donor, is suitably in the range from 3.4 to 5.2, preferably 3.8 to 4.7, more preferably 4.1 to 4.5, particularly 4.2 to 4.4, and especially 4.25 to 4.35 glycoside units, preferably glucose units.

In one embodiment, the mean DP of the glycoside chain of the alkyl polyglycoside intermediate, preferably when cyclodextrin is the glycosyl donor, is suitably in the range from 3.0 to 4.5, preferably 3.2 to 4.2, more preferably 3.4 to 4.0, particularly 3.5 to 3.9, and especially 3.6 to 3.8 glycoside units, preferably glucose units.

In one embodiment, the mean DP of the glycoside chain of the alkyl glycoside is increased during the enzyme reaction to form the alkyl polyglycoside intermediate by an amount greater than or equal 1.0, suitably in the range from 1.5 to 5.0, preferably 2.0 to 4.5, more preferably 2.5 to 4.0 particularly 2.8 to 3.5, and especially 3.0 to 3.3 glycoside units, preferably glucose units, i.e. per alkyl chain.

The alkyl polyglycoside, preferably alkyl polyglucoside, intermediate suitably comprises a composition or mixture of glycoside, preferably glucoside, chains comprising from 1 up to 10 glycoside units, i.e. selected from the group consisting of 1 (alkyl monoglycoside (DP1)), 2 (alkyl diglycoside (DP2)), 3 (alkyl triglycoside (DP3)), 4 (alkyl tetraglycoside (DP4)), 5 (alkyl pentaglycoside (DP5)), 6 (alkyl hexaglycoside (DP6)), 7 (alkyl heptaglycoside (DP7)), 8 (alkyl octaglycoside (DP8)), 9 (alkyl nonaglycoside (DP9)), 10 (alkyl decaglycoside (DP10)), and mixtures thereof. Alkyl polyglycosides having glycoside chains greater than 10 glycoside units (e.g. DP11 up to DP15) may also be present in the mixture, but these will generally be in smaller amounts.

In one embodiment, the alkyl polyglycoside, preferably alkyl polyglucoside, intermediate composition (i) suitably comprises less than or equal to 0.50, more suitably less than or equal to 0.45, preferably less than or equal to 0.40, more preferably less than or equal to 0.35, particularly less than or equal to 0.30, and especially less than or equal to 0.25 mole fraction of DP1, and/or (ii) suitably comprises greater than or equal to 0.05, more suitably greater than or equal to 0.10, preferably greater than or equal to 0.14, more preferably greater than or equal to 0.16, particularly greater than or equal to 0.18, and especially greater than or equal to 0.20 mole fraction of DP1, both based on the total amount of DP1 to DP15 alkyl polyglycosides in the composition.

The alkyl monoglycoside (DP1)) component of the alkyl polyglycoside intermediate may have the same chemical structure as at least some of the alkyl glycoside starting material, i.e. it could be considered to be unreacted starting material, but without being bound by theory, it is likely that substantially all of the alkyl monoglycoside starting material will have been extended by addition of glycoside residues in a coupling reaction and subsequently shortened by removal of glycoside residues in disproportionation and hydrolysis reactions during the enzyme reaction to form DP1, DP2, DP3 and other components with longer glycoside chains.

In one embodiment, the alkyl polyglycoside, preferably alkyl polyglucoside, intermediate composition (i) suitably comprises less than or equal to 0.40, more suitably less than or equal to 0.35, preferably less than or equal to 0.30, more preferably less than or equal to 0.25, particularly less than or equal to 0.20, and especially less than or equal to 0.18 mole fraction of DP2, and/or (ii) suitably comprises greater than or equal to 0.03, more suitably greater than or equal to 0.06, preferably greater than or equal to 0.09, more preferably greater than or equal to 0.12, particularly greater than or equal to 0.14, and especially greater than or equal to 0.16 mole fraction of DP2, both based on the total amount of DP1 to DP15 alkyl polyglycosides in the composition.

In one embodiment, the alkyl polyglycoside, preferably alkyl polyglucoside, intermediate composition (i) suitably comprises less than or equal to 0.40, more suitably less than or equal to 0.30, preferably less than or equal to 0.25, more preferably less than or equal to 0.20, particularly less than or equal to 0.16, and especially less than or equal to 0.14 mole fraction of DP3, and/or (ii) suitably comprises greater than or equal to 0.02, more suitably greater than or equal to 0.05, preferably greater than or equal to 0.07, more preferably greater than or equal to 0.09, particularly greater than or equal to 0.11, and especially greater than or equal to 0.12 mole fraction of DP3, both based on the total amount of DP1 to DP15 alkyl polyglycosides in the composition.

In one embodiment, the alkyl polyglycoside, preferably alkyl polyglucoside, intermediate composition (i) suitably comprises less than or equal to 0.35, more suitably less than or equal to 0.25, preferably less than or equal to 0.20, more preferably less than or equal to 0.16, particularly less than or equal to 0.14, and especially less than or equal to 0.13 mole fraction of DP4, and/or (ii) suitably comprises greater than or equal to 0.02, more suitably greater than or equal to 0.04, preferably greater than or equal to 0.06, more preferably greater than or equal to 0.08, particularly greater than or equal to 0.10, and especially greater than or equal to 0.11 mole fraction of DP4, both based on the total amount of DP1 to DP15 alkyl polyglycosides in the composition.

In one embodiment, the alkyl polyglycoside, preferably alkyl polyglucoside, intermediate composition (i) suitably comprises less than or equal to 0.80, more suitably less than or equal to 0.70, preferably less than or equal to 0.65, more preferably less than or equal to 0.60, particularly less than or equal to 0.56, and especially less than or equal to 0.54 mole fraction of DP1 to DP3, and/or (ii) suitably comprises greater than or equal to 0.20, more suitably greater than or equal to 0.30, preferably greater than or equal to 0.40, more preferably greater than or equal to 0.45, particularly greater than or equal to 0.48, and especially greater than or equal to 0.50 mole fraction of DP1 to DP3, both based on the total amount of DP1 to DP15 alkyl polyglycosides in the composition.

In one embodiment, the alkyl polyglycoside, preferably alkyl polyglucoside, intermediate composition (i) suitably comprises less than or equal to 0.65, more suitably less than or equal to 0.60, preferably less than or equal to 0.55, more preferably less than or equal to 0.50, particularly less than or equal to 0.45, and especially less than or equal to 0.42 mole fraction of DP4 to DP10, and/or (ii) suitably comprises greater than or equal to 0.20, more suitably greater than or equal to 0.25, preferably greater than or equal to 0.30, more preferably greater than or equal to 0.33, particularly greater than or equal to 0.36, and especially greater than or equal to 0.38 mole fraction of DP4 to DP10, both based on the total amount of DP1 to DP15 alkyl polyglycosides in the composition.

In one embodiment, the alkyl polyglycoside, preferably alkyl polyglucoside, intermediate composition (i) suitably comprises less than or equal to 0.25, more suitably less than or equal to 0.20, preferably less than or equal to 0.15, more preferably less than or equal to 0.12, particularly less than or equal to 0.09, and especially less than or equal to 0.08 mole fraction of DP11 to DP15, and/or (ii) suitably comprises greater than or equal to 0.01, more suitably greater than or equal to 0.02, preferably greater than or equal to 0.03, more preferably greater than or equal to 0.04, particularly greater than or equal to 0.05, and especially greater than or equal to 0.06 mole fraction of DP11 to DP15, both based on the total amount of DP1 to DP15 alkyl polyglycosides in the composition.

In one embodiment, (i) the ratio of the mole fraction of DP1 to DP2 in the alkyl polyglycoside, preferably alkyl polyglucoside, intermediate composition is suitably in the range from 1.0 to 3.0:1.0, more suitably 1.1 to 2.5:1.0, preferably 1.15 to 2.0:1.0, more preferably 1.2 to 1.8:1.0, particularly 1.23 to 1.7:1.0, and especially 1.25 to 1.6:1.0; and/or (ii) the ratio of the mole fraction of DP3 to DP1 in the alkyl polyglycoside, preferably alkyl polyglucoside, intermediate composition is suitably in the range from 0.1 to 1.0:1.0, more suitably 0.2 to 0.9:1.0, preferably 0.3 to 0.8:1.0, more preferably 0.35 to 0.75:1.0, particularly 0.4 to 0.7:1.0, and especially 0.45 to 0.65:1.0; and/or (iii) the ratio of the mole fraction of DP2 to DP3 in the alkyl polyglycoside, preferably alkyl polyglucoside, intermediate composition is suitably in the range from 0.8 to 2.5:1.0, more suitably 1.0 to 2.0:1.0, preferably 1.05 to 1.8:1.0, more preferably 1.1 to 1.7:1.0, particularly 1.15 to 1.6:1.0, and especially 1.2 to 1.5:1.0; and/or (iv) the ratio of the mole fraction of DP3 to DP4 in the alkyl polyglycoside, preferably alkyl polyglucoside, intermediate composition is suitably in the range from 0.7 to 2.0:1.0, more suitably 0.8 to 1.7:1.0, preferably 0.85 to 1.4:1.0, more preferably 0.9 to 1.3:1.0, particularly 0.95 to 1.25:1.0, and especially 1.0 to 1.2:1.0.

In one embodiment, the alkyl polyglycoside, preferably alkyl polyglucoside, intermediate composition is in the form of a Flory-Schulz distribution. It is surprising for such a distribution to be obtained from an enzyme reaction as described herein.

The alkyl polyglycoside intermediate can be represented by the formula $R_m\text{-}G_p$, wherein R is an alkyl group comprising m carbon atoms, both defined herein, G is at least one monosaccharide residue, defined herein, p is the number of monosaccharide residues, p=(n+q) wherein n is the number of monosaccharide residues in the alkyl glycoside starting material and q is the increase in the number of monosaccharide residues that occurs during the enzyme reaction, the mean value of n is defined herein (mean DP of alkyl glycoside starting material), the mean value of p is defined herein (mean DP after enzyme reaction), and the mean value of q is defined herein (increase in mean DP that occurs during the enzyme reaction).

The alkyl polyglycoside intermediate can be fractionated by a variety of methods known in the art, for example by using flash chromatography or extraction, to primarily remove DP1 and DP2 to form the alkyl polyglycoside composition, which can be used in the applications herein described. This alkyl polyglycoside, preferably alkyl polyglucoside, is referred to herein as the alkyl polyglycoside, preferably alkyl polyglucoside, product. The fraction mainly containing DP1 and DP2 also has useful properties and can be used, for example, as an emulsifier, wetting agent, dispersant, rheology modifier and/or thickener. This material is referred to herein as the alkyl polyglycoside side-product.

Thus, the alkyl polyglycoside intermediate can be fractionated to form the alkyl polyglycoside product and optionally the alkyl polyglycoside side-product. In one embodiment, the alkyl polyglycoside intermediate is not purified or isolated before fractionation, and suitably fractionation is carried out on the crude enzyme reaction mixture comprising the alkyl polyglycoside intermediate.

In one embodiment, the alkyl chain component of the alkyl polyglycoside product suitably reflects/essentially is the same as the alkyl chain component of the alkyl glycoside starting material and/or the alkyl polyglycoside intermediate, as defined herein. In one embodiment, the alkyl chain component of the alkyl polyglycoside product suitably comprises a mixture of C16 and C18 alkyl groups, wherein the molar ratio of C16:C18 alkyl groups is suitably in the range from 1.0 to 12.0:1.0, preferably 2.0 to 8.0:1.0, more preferably 2.5 to 5.0:1.0, particularly 3.0 to 4.0:1.0, and especially 3.3 to 3.4:1.0.

As for the alkyl polyglycoside intermediate, the chemical composition of glycoside component of the alkyl polyglycoside product will depend upon the chemical composition of both the alkyl glycoside and the glycosyl donor, i.e. preferably comprising, consisting essentially of, or consisting of glucose residues. Thus, the chemical composition of glycoside component of the alkyl polyglycoside product preferably comprises, consists essentially of, or consists of glucose residues.

The alkyl polyglycoside product also comprises most of the DP1 to DP15 components defined herein in relation to the alkyl polyglycoside intermediate, but the detailed composition and concentration of the individual components, particularly DP1 and DP2, differ greatly from the alkyl polyglycoside intermediate resulting in significantly improved properties, in particular when used in combination with active pharmaceutical ingredients (APIs) as described herein.

The mean length or mole-average degree of polymerization (mean DP) of the glycoside chain of the alkyl polyglycoside, preferably alkyl polyglucoside, product is (i) suitably greater than or equal to 3.0, more suitably greater than or equal to 3.5, preferably greater than or equal to 4.0, more preferably greater than or equal to 4.5, particularly greater than or equal to 4.8, and especially greater than or equal to 5.0 glycoside units, preferably glucose units; and/or (ii) suitably less than or equal to 8.0, more suitably less than or equal to 7.5, preferably less than or equal to 7.0, more preferably less than or equal to 6.6, particularly less than or equal to 6.2, and especially less than or equal to 6.0 glycoside units, preferably glucose units i.e. per alkyl chain.

In one embodiment, the mean DP of the glycoside chain of the alkyl polyglycoside product composition is suitably in the range from 3.9 to 7.3, preferably 4.4 to 6.8, more preferably 4.8 to 6.4, particularly 5.1 to 6.1, and especially 5.3 to 5.8 glycoside units, preferably glucose units.

In one embodiment, the mean DP of the glycoside chain of the alkyl polyglycoside is increased by the fractionation of the alkyl polyglycoside intermediate to form the alkyl polyglycoside product by an amount greater than or equal to 0.3, suitably in the range from 0.5 to 3.5, preferably 0.6 to 2.5, more preferably 0.7 to 2.0 particularly 0.8 to 1.5, and especially 0.9 to 1.1 glycoside units, preferably glucose units, i.e. per alkyl chain.

In one embodiment, the mean DP of the glycoside chain of the alkyl polyglycoside is increased by the fractionation of the alkyl polyglycoside intermediate to form the alkyl polyglycoside product by an amount greater than or equal to 0.7, suitably in the range from 1.0 to 3.5, preferably 1.3 to 3.0, more preferably 1.6 to 2.5 particularly 1.8 to 2.3, and especially 1.9 to 2.1 glycoside units, preferably glucose units, i.e. per alkyl chain.

In one embodiment, the alkyl polyglycoside, preferably alkyl polyglucoside, product composition suitably comprises from zero to less than or equal to 0.20, more suitably less than or equal to 0.15, preferably less than or equal to 0.10, more preferably less than or equal to 0.05, particularly less than or equal to 0.03, and especially less than or equal to 0.02 mole fraction of DP1 based on the total amount of DP1 to DP15 alkyl polyglycosides in the composition.

In one embodiment, the alkyl polyglycoside, preferably alkyl polyglucoside, product composition suitably comprises from zero to less than or equal to 0.30, more suitably less than or equal to 0.20, preferably less than or equal to 0.15, more preferably less than or equal to 0.10, particularly less than or equal to 0.05, and especially less than or equal to 0.03 mole fraction of DP2 based on the total amount of DP1 to DP15 alkyl polyglycosides in the composition.

In one embodiment, the alkyl polyglycoside, preferably alkyl polyglucoside, product composition (i) suitably comprises less than or equal to 0.30, more suitably less than or equal to 0.25, preferably less than or equal to 0.23, more preferably less than or equal to 0.21, particularly less than or equal to 0.19, and especially less than or equal to 0.17 mole fraction of DP3, and/or (ii) suitably comprises greater than or equal to 0.05 more suitably greater than or equal to 0.07, preferably greater than or equal to 0.09, more preferably greater than or equal to 0.11, particularly greater than or equal to 0.13, and especially greater than or equal to 0.14 mole fraction of DP3, both based on the total amount of DP1 to DP15 alkyl polyglycosides in the composition.

In one embodiment, the alkyl polyglycoside, preferably alkyl polyglucoside, product composition (i) suitably comprises less than or equal to 0.40, more suitably less than or equal to 0.35, preferably less than or equal to 0.30, more preferably less than or equal to 0.27, particularly less than or equal to 0.25, and especially less than or equal to 0.24 mole fraction of DP4, and/or (ii) suitably comprises greater than or equal to 0.05 more suitably greater than or equal to 0.10, preferably greater than or equal to 0.15, more preferably greater than or equal to 0.18, particularly greater than or equal to 0.20, and especially greater than or equal to 0.21 mole fraction of DP4, both based on the total amount of DP1 to DP15 alkyl polyglycosides in the composition.

In one embodiment, the alkyl polyglycoside, preferably alkyl polyglucoside, product composition (i) suitably comprises less than or equal to 0.35, more suitably less than or equal to 0.30, preferably less than or equal to 0.25, more preferably less than or equal to 0.22, particularly less than or equal to 0.20, and especially less than or equal to 0.19 mole fraction of DP1 to DP3, and/or (ii) suitably comprises greater than or equal to 0.05 more suitably greater than or equal to 0.08, preferably greater than or equal to 0.10, more preferably greater than or equal to 0.12, particularly greater than or equal to 0.13, and especially greater than or equal to 0.14 mole fraction of DP1 to DP3, both based on the total amount of DP1 to DP15 alkyl polyglycosides in the composition.

In one embodiment, the alkyl polyglycoside, preferably alkyl polyglucoside, product composition (i) suitably comprises less than or equal to 0.95, more suitably less than or equal to 0.90, preferably less than or equal to 0.88, more preferably less than or equal to 0.86, particularly less than or equal to 0.84, and especially less than or equal to 0.82 mole fraction of DP4 to DP10, and/or (ii) suitably comprises greater than or equal to 0.50, more suitably greater than or equal to 0.60, preferably greater than or equal to 0.70, more preferably greater than or equal to 0.74, particularly greater than or equal to 0.76, and especially greater than or equal to 0.78 mole fraction of DP4 to DP10, both based on the total amount of DP1 to DP15 alkyl polyglycosides in the composition.

In one embodiment, the alkyl polyglycoside, preferably alkyl polyglucoside, product composition (i) suitably comprises less than or equal to 0.15, more suitably less than or equal to 0.10, preferably less than or equal to 0.08, more preferably less than or equal to 0.07, particularly less than or equal to 0.06, and especially less than or equal to 0.05 mole fraction of DP11 to DP15, and/or (ii) suitably comprises greater than or equal to 0.005, more suitably greater than or equal to 0.010, preferably greater than or equal to 0.0150, more preferably greater than or equal to 0.020, particularly greater than or equal to 0.025, and especially greater than or equal to 0.030 mole fraction of DP11 to DP15, both based on the total amount of DP1 to DP15 alkyl polyglycosides in the composition.

In one embodiment, the alkyl polyglycoside, preferably alkyl polyglucoside, product composition (i) suitably comprises less than or equal to 0.040, more suitably less than or equal to 0.030, preferably less than or equal to 0.025, more preferably less than or equal to 0.020, particularly less than or equal to 0.015, and especially less than or equal to 0.010 mole fraction of DP11 to DP15, based on the total amount of DP1 to DP15 alkyl polyglycosides in the composition. Such alkyl polyglycoside, preferably alkyl polyglucoside, product compositions can have surprisingly improved transparency in aqueous solution.

In one embodiment, the ratio of the mole fraction of DP3 to DP1 in the alkyl polyglycoside, preferably alkyl polyglucoside, product composition is suitably greater than 2.0:1.0, more suitably greater than 10:1.0, preferably greater than 30:1.0, more preferably greater than 60:1.0, particularly greater than 80:1.0, and especially greater than 100:1.0.

In one embodiment, the ratio of the mole fraction of DP3 to DP4 in the alkyl polyglycoside, preferably alkyl polyglucoside, product composition is suitably in the range from 0.20 to 2.0:1.0, more suitably 0.30 to 1.0:1.0, preferably 0.40 to 0.95:1.0, more preferably 0.50 to 0.90:1.0, particularly 0.55 to 0.85:1.0, and especially 0.60 to 0.80:1.0.

In one embodiment, the alkyl polyglycoside, preferably alkyl polyglucoside, product composition (i) suitably comprises less than or equal to 0.30, more suitably less than or equal to 0.25, preferably less than or equal to 0.20, more preferably less than or equal to 0.19, particularly less than or equal to 0.18, and especially less than or equal to 0.17 more mole fraction of DP3 than mole fraction of DP1 (i.e. DP3 minus DP1), and/or (ii) suitably comprises greater than or equal to 0.03, more suitably greater than or equal to 0.08, preferably greater than or equal to 0.10, more preferably greater than or equal to 0.12, particularly greater than or equal to 0.13, and especially greater than or equal to 0.14 more mole fraction of DP3 than mole fraction of DP1 (i.e.

DP3 minus DP1), both based on the total amount of DP1 to DP15 alkyl polyglycosides in the composition.

The alkyl polyglycoside product according to the invention can be represented by the formula $R_m\text{-}G_s$,
wherein
R is an alkyl group comprising m carbon atoms, both defined herein,
G is at least one monosaccharide residue, defined herein,
s is the number of monosaccharide residues,
s is (p+t) wherein p is the number of monosaccharide residues in the alkyl polyglycoside intermediate, and t is the increase in the number of monosaccharide residues that occurs during fractionation of the alkyl polyglycoside intermediate, the mean value of s is defined herein (mean DP of alkyl polyglycoside product), the mean value of p is defined herein (mean DP of the alkyl polyglycoside intermediate), and
the mean value of t is defined herein (increase in mean DP that occurs during the fractionation of the alkyl polyglycoside intermediate).

In one embodiment, the alkyl chain component of alkyl polyglycoside, preferably alkyl polyglucoside, side-product composition referred to above suitably reflects/essentially is the same as the alkyl chain component of the alkyl glycoside starting material, the alkyl glycoside intermediate and the alkyl polyglycoside product, as defined herein. In one embodiment, the alkyl chain component of the alkyl polyglycoside side-product suitably comprises a mixture of C16 and C18 alkyl groups, wherein the molar ratio of C16:C18 alkyl groups is suitably in the range from 0.1 to 5.0:1.0, preferably 0.3 to 3.0:1.0, more preferably 0.5 to 1.5:1.0, particularly 0.7 to 1.0:1.0, and especially 0.8 to 0.9:1.0.

As for both the alkyl polyglycoside intermediate and the alkyl polyglycoside product, the chemical composition of glycoside component of the alkyl polyglycoside side-product will depend upon the chemical composition of both the alkyl glycoside and the glycosyl donor, i.e. preferably comprising, consisting essentially of, or consisting of glucose residues. Thus, the chemical composition of glycoside component of the alkyl polyglycoside side-product preferably comprises, consists essentially of, or consists of glucose residues.

The alkyl polyglycoside side-product primarily comprises DP1, DP2, DP3 and DP4 components, small amounts of DP5 to DP10 components and very small or substantially no DP11 to DP15 components, all as defined herein.

In one embodiment, the mean DP of the glycoside chain of the alkyl polyglycoside side-product composition is less than 2.5, suitably in the range from 1.2 to 2.3, preferably 1.4 to 2.2, more preferably 1.5 to 2.1, particularly 1.6 to 2.0, and especially 1.7 to 1.9 glycoside, preferably glucose, units.

In one embodiment, the alkyl polyglycoside side-product composition (i) suitably comprises less than or equal to 0.80, more suitably less than or equal to 0.70, preferably less than or equal to 0.65, more preferably less than or equal to 0.60, particularly less than or equal to 0.56, and especially less than or equal to 0.53 mole fraction of DP1, and/or (ii) suitably comprises greater than or equal to 0.25, more suitably greater than or equal to 0.30, preferably greater than or equal to 0.35, more preferably greater than or equal to 0.40, particularly greater than or equal to 0.45, and especially greater than or equal to 0.49 mole fraction of DP1, both based on the total amount of DP1 to DP15 alkyl polyglycosides in the composition.

In one embodiment alkyl polyglycoside side-product composition (i) suitably comprises less than or equal to 0.50, more suitably less than or equal to 0.45, preferably less than or equal to 0.40, more preferably less than or equal to 0.36, particularly less than or equal to 0.34, and especially less than or equal to 0.33 mole fraction of DP2, and/or (ii) suitably comprises greater than or equal to 0.15, more suitably greater than or equal to 0.20, preferably greater than or equal to 0.25, more preferably greater than or equal to 0.28, particularly greater than or equal to 0.30, and especially greater than or equal to 0.31 mole fraction of DP2, both based on the total amount of DP1 to DP15 alkyl polyglycosides in the composition.

In one embodiment, the alkyl polyglycoside side-product composition (i) suitably comprises less than or equal to 0.20, more suitably less than or equal to 0.17, preferably less than or equal to 0.14, more preferably less than or equal to 0.12, particularly less than or equal to 0.11, and especially less than or equal to 0.10 mole fraction of DP3, and/or (ii) suitably comprises greater than or equal to 0.01, more suitably greater than or equal to 0.03, preferably greater than or equal to 0.05, more preferably greater than or equal to 0.06, particularly greater than or equal to 0.07, and especially greater than or equal to 0.08 mole fraction of DP3, both based on the total amount of DP1 to DP15 alkyl polyglycosides in the composition.

In one embodiment, the alkyl polyglycoside side-product composition (i) suitably comprises less than or equal to 0.10, more suitably less than or equal to 0.08, preferably less than or equal to 0.07, more preferably less than or equal to 0.065, particularly less than or equal to 0.06, and especially less than or equal to 0.055 mole fraction of DP4, and/or (ii) suitably comprises greater than or equal to 0.01, more suitably greater than or equal to 0.02, preferably greater than or equal to 0.03, more preferably greater than or equal to 0.035, particularly greater than or equal to 0.04, and especially greater than or equal to 0.045 mole fraction of DP4, both based on the total amount of DP1 to DP15 alkyl polyglycosides in the composition.

In one embodiment, the alkyl polyglycoside side-product composition (i) suitably comprises less than or equal to 0.080, more suitably less than or equal to 0.070, preferably less than or equal to 0.060, more preferably less than or equal to 0.050, particularly less than or equal to 0.045, and especially less than or equal to 0.040 mole fraction of DP5 to DP10, and/or (ii) suitably comprises greater than or equal to 0.001, more suitably greater than or equal to 0.005, preferably greater than or equal to 0.010, more preferably greater than or equal to 0.015, particularly greater than or equal to 0.018, and especially greater than or equal to 0.020 mole fraction of DP5 to DP10, both based on the total amount of DP1 to DP15 alkyl polyglycosides in the composition.

In one embodiment, the alkyl polyglycoside side-product composition suitably comprises less than or equal to 0.020, more suitably less than or equal to 0.015, preferably less than or equal to 0.010, more preferably less than or equal to 0.005, particularly less than or equal to 0.003, and especially less than or equal to 0.001 mole fraction of DP11 to DP15, based on the total amount of DP1 to DP15 alkyl polyglycosides in the composition.

In one embodiment, (i) the ratio of the mole fraction of DP1 to DP2 in the alkyl polyglycoside, preferably alkyl polyglucoside, side-product composition is suitably in the range from 1.0 to 3.0:1.0, more suitably 1.1 to 2.5:1.0, preferably 1.2 to 2.2:1.0, more preferably 1.3 to 2.0:1.0, particularly 1.4 to 1.8:1.0, and especially 1.5 to 1.7:1.0, and/or (ii) the ratio of the mole fraction of DP1 to DP3 in the alkyl polyglycoside, preferably alkyl polyglucoside, side-product composition is suitably in the range from 3.0 to 15.0:1.0, more suitably 3.5 to 9.0:1.0, preferably 4.0 to 7.0:1.0, more preferably 4.5 to 6.7:1.0, particularly 4.8 to 6.5:1.0, and especially 5.0 to 6.3:1.0, and/or (iii) the ratio of the mole fraction of DP2 to DP3 in the alkyl polyglycoside, preferably alkyl polyglucoside, side-product composition is suitably in the range from 2.0 to 10.0:1.0, more suitably 2.5 to 7.0:1.0, preferably 3.0 to 5.0:1.0, more preferably 3.1 to 4.5:1.0, particularly 3.2 to 4.0:1.0, and especially 3.3 to 3.8:1.0.

The alkyl polyglycoside, preferably alkyl polyglucoside, side-product may be used, for example as an emulsifier, wetting agent, rheology modifier, thickener and/or dispersing agent in a wide range of applications such as personal care, crop care and health care formulations.

One surprising advantage of the alkyl polyglycoside product according to the present invention is improved transparency in aqueous solution. In one embodiment, the alkyl polyglycoside product defined herein has a transmittance value, measured as described herein at 400 nm, of greater than 85.0%, suitably greater than 90.0%, preferably greater than 92.0%, more preferably greater than 94.0%, particularly greater than 96.0%, and especially greater than 97.0% at any concentration up to and including 1.0 wt % aqueous solution.

The alkyl polyglycoside product can act as an effective emulsifier in a wide range of water-in-oil, and preferably in oil-in-water emulsions, particularly for use in personal care and especially health care formulations. The concentration of the oil phase is suitably in the range from 1 to 90%, preferably 3 to 60%, more preferably 5 to 40%, particularly 8 to 20%, and especially 10 to 15% by weight of the total composition. The amount of water present in the emulsion is suitably greater than 5%, preferably in the range from 30 to 90%, more preferably 50 to 90%, particularly 70 to 85%, and especially 75 to 80% by weight of the total composition. The amount of alkyl polyglycoside product used as emulsifier in such emulsions is suitably in the range from 0.01 to 10%, preferably 0.1 to 6.0%, more preferably 0.5 to 3.0%, particularly 0.8 to 2.0%, and especially 1.0 to 1.5%, by weight of the total composition.

The oil phase of the emulsion is preferably a cosmetically or pharmaceutically acceptable material. Suitable materials, for example include oils of the type widely used in personal care or cosmetic products, such as those registered as solvents by the Cosmetics Toiletries and Fragrance Association. Suitable health care or pharmaceutically acceptable materials are listed in national and international pharmacopoeia (e.g. United States Pharmacopoeia, Pharmacopoeia Europaea, Pharmacopoeia Internationalis and Japanese Pharmacopoeia), and also found amongst materials designated "generally recognised as safe" (GRAS) by the FDA.

The oil phase preferably comprises, consists essentially of, or consists of one or more oily materials, such as those selected from the group consisting of glyceride oils, vegetable oils, ester oils such as isopropyl myristate, fatty alcohol alkoxylates, alkyl carbonates, lanolin, mineral oils and silicone oils, and mixtures thereof. Suitable silicone oils or siloxane fluids include a cyclic oligomeric dialkylsiloxane, such as the cyclic pentamer of dimethylsiloxane known as cyclomethicone. Alternative siloxane fluids include dimethylsiloxane linear oligomers or polymers having a suitable fluidity and phenyltris(trimethylsiloxy)silane (also known as phenyltrimethicone).

The alkyl polyglycoside product according to the present invention is an effective solubilizer and can be used to solubilize a wide range of compounds that are insoluble or poorly soluble in water. Such compounds may be active ingredients or solutes, such as lipids, surfactants, particularly non-ionic surfactants, perfumes, essential oils, colorants, pigments, proteins, steroids, and active pharmaceutical ingredients (APIs). In particular, the alkyl polyglycoside product can be used as a solubilizing agent for the personal care and health care sectors. In these sectors the most commonly used solubilizing agents generally contain at least one non-renewable polyoxyethylenated derivative. For example, polysorbate 80 is often used in pharmaceutical compositions. Alternatives to polyethoxylated solubilizing agents do not generally have an equivalent level of effectiveness. Surprisingly, the alkyl polyglycoside product defined herein can be used as a complete, or partial, replacement for polyoxyethylenated derivatives, in personal care and health case compositions, particularly for replacing polysorbate 80, in pharmaceutical compositions.

The use of the alkyl polyglycoside product as a solubilizer can also result in a composition having surprisingly improved transparency. Thus, in one embodiment the subject matter of the present invention includes a clear composition comprising (i) in the range from 0.001 to 10.0 wt %, preferably 0.005 to 5.0 wt %, more preferably 0.01 to 3.0 wt %, particularly 0.05 to 2.0 wt %, and especially 0.1 to 1.0 wt % of at least one water insoluble material, solubilized by (ii) in the range from 0.01 to 75.0 wt %, preferably 0.05 to 50.0 wt %, more preferably 0.1 to 30.0 wt %, particularly 0.5 to 20.0 wt %, and especially 0.1 to 10.0 wt % of alkyl polyglycoside product defined herein, and (iii) in the range from 15.0 to 99.99 wt %, preferably 45.0 to 99.95 wt %, more preferably 67.0 to 99.89 wt %, particularly 78.0 to 99.45 wt %, and especially 89.0 to 98.9 wt % of water.

The water insoluble material is suitably an active cosmetic or pharmaceutical ingredient, in particular an active pharmaceutical ingredient (API), such as a steroid or hydrophobic peptide.

The clear composition may also contain other materials such as excipients that are soluble in water, in particular non-ionic, anionic, cationic surfactants, salts, pH adjusters, hydrating agents, chelates, metal ions, polymers, dispersing agents, colorants, preservatives and hydrotropes.

The clear composition defined above suitably has a transmittance value, measured as described herein at 400 nm, of greater than 75.0%, more suitably greater than 80.0%, preferably greater than 85.0%, more preferably greater than 90.0%, particularly greater than 93.0%, and especially greater than 95.0%.

In one embodiment the subject matter of the present invention includes a pharmaceutical composition comprising (i) in the range from 0.001 to 10.0 wt %, preferably 0.005 to 5.0 wt %, more preferably 0.01 to 3.0 wt %, particularly 0.05 to 2.0 wt %, and especially 0.1 to 1.0 wt % of at least API, (ii) in the range from 0.01 to 75.0 wt %, preferably 0.05 to 50.0 wt %, more preferably 0.1 to 30.0 wt %, particularly 0.5 to 20.0 wt %, and especially 0.1 to 10.0 wt % of alkyl polyglycoside product defined herein, and (iii) in the range from 15.0 to 99.99 wt %, preferably 45.0 to 99.95 wt %, more preferably 67.0 to 99.89 wt %, particularly 78.0 to 99.45 wt %, and especially 89.0 to 98.9 wt % of water.

The pharmaceutical composition may also contain other materials such as excipients that are soluble in water, in particular non-ionic, anionic, cationic surfactants, salts, pH adjusters, hydrating agents, chelates, metal ions, polymers, dispersing agents, colorants, preservatives and hydrotropes.

The presence of the alkyl polyglycoside product defined herein in pharmaceutical compositions containing at least one API can also surprisingly result in stable compositions, i.e. low or even reduced (for example compared to polysorbate 80) degradation of the API, e.g. budesonide. Thus, in one embodiment the pharmaceutical composition has an API recovery, measured as described herein in suspension and/or solution, of greater than 87%, preferably greater than 89%, more preferably greater than 91%, particularly greater than 93%, and especially greater than 95% at 60° C. after 3 months, preferably after 6 months.

The alkyl polyglycoside product may also be used to stabilise peptides and proteins, for example insulin, monoclonal antibodies, growth hormone, fusion protein, erythropoietin and interferon, such as to reduce or prevent the aggregation and/or precipitation thereof in aqueous media.

In one embodiment the subject matter of the present invention includes a pharmaceutical composition comprising (i) in the range from 0.001 to 10.0 wt %, preferably 0.005 to 5.0 wt %, more preferably 0.01 to 3.0 wt %, particularly 0.05 to 2.0 wt %, and especially 0.1 to 1.0 wt % of at least one protein and/or peptide, (ii) in the range from 0.01 to 75.0 wt %, preferably 0.05 to 50.0 wt %, more preferably 0.1 to 30.0 wt %, particularly 0.5 to 20.0 wt %, and especially 0.1 to 10.0 wt % of alkyl polyglycoside product defined herein, and (iii) in the range from 15.0 to 99.99 wt %, preferably 45.0 to 99.95 wt %, more preferably 67.0 to 99.89 wt %, particularly 78.0 to 99.45 wt %, and especially 89.0 to 98.9 wt % of water.

All of the features described herein may be combined with any of the above aspects, in any combination.

The following test methods were used;

1) Composition of Alkyl Polyglycoside.

The alkyl polyglycosides were analysed using an HPLC system with a C-18 column. An appropriate dilution of the sample was injected on the system and separated on the column using a dual mobile phase. The mobile phase had a hydrophobic component (e.g. acetonitrile) and a hydrophilic component (e.g. 0.1% acetic acid). The method started with a low hydrophobic content in the mobile phase which was gradually increased during the analysis. To identify and quantify the components eluting from the column a CAD-detector (Charged Aerosol Detector) and a mass spectrometer were used. In order to get a constant composition of mobile phase to the detector, a reversed gradient was used which connected to the analytical flow just before the detector. This method makes it possible to calculate the DP profile, including the mean DP, of the alkyl polyglycoside and the glycoside (or glucose) units conversion rate of the enzyme reaction.

2) Transmittance Value of Alkyl Polyglycoside.

1.0% w/w solution of alkyl polyglycoside in de-ionised water was made and transferred into a disposable 1.6 ml polystyrene micro-cuvette. Measurements were carried out on a Jenway Spectrophotometer 6300 at wavelength of 400 nm. Before each measurement, the machine was calibrated relative to de-ionised water using the in-built calibration method.

3) Solubility of API in Alkyl Polyglycoside.

a) Maximum Solubility Sample Preparation.

1.0% w/w solution of alkyl polyglycoside was prepared by dissolving in de-ionised water using a 5 decimal point balance. The solutions were placed on a Stuart Roller Mix to mix the solution, without causing an excess of foam for approximately 15 minutes. To assess maximum solubility, approximately 5 mg API was added to a centrifuge tube with 1.0 ml alkyl polyglycoside solution. After vortexing to produce a coarse suspension of the API, centrifuge tubes were placed on a rotating mixer set to 4 rpm, and the samples were allowed to equilibrate over a period of 48 hours at a temperature of 25° C. Periodic visual assessment of the samples determined whether additional API was required, or whether insoluble API remained at the end of 48 hours, indicating saturation of the alkyl polyglycoside solution with the API. The samples were then centrifuged (5 minutes at 10,000 rpm) to sediment any excess API, before centrifuging again through a centrifuge filter to ensure that the samples contained no particulate matter prior to HPLC analysis. The saturated API/alkyl polyglycoside solution was then pipetted in to an HPLC vial for analysis, with no dilution required. The samples were then run on a Agilent 1260 Infinity II HPLC with diode array detector. The concentration of each the active was calculated using the peak area and a standard curve.

b) Preparing Standard Curve.

The standard curve was produced by preparing stock solutions of each API in methanol with a concentration at either 1 or 2 mg ml$^{-1}$ (actual masses of API and concentrations recorded). These stock solutions were then used to prepare dilutions, and subsequent serial dilutions, by diluting with the appropriate mobile phase for each API. A series of calibration standards with concentrations of 1.0, 0.5, 0.1, 0.05, 0.01, 0.005, 0.001 and 0.0005 mg ml$^{-1}$ were prepared for HPLC analysis.

c) HPLC Conditions.

Budesonide

| | |
|---|---|
| HPLC column | Zorvax Eclipse Plus C18, 4.6 × 150 mm, 5 μm |
| Mobile phase composition | 68/30/2 50 mM phosphate buffer, pH 2.8/acetonitrile/ethanol |
| Column temperature | 30° C. |
| Flow rate | 1.5 ml min$^{-1}$ |
| Injection volume | 10 μl |
| Run time | 35 mins |
| Detection wavelength | 240 nm |

Progesterone

| | |
|---|---|
| HPLC column | Zorbax Eclipse Plus C8, 4.6 × 150 mm, 5 μm |
| Mobile phase composition | 75/25 methanol/water |
| Column temperature | 30° C. |
| Flow rate | 1.0 ml min$^{-1}$ |
| Injection volume | 5 μl |
| Run time | 10 mins |
| Detection wavelength | 254 nm |

4) Transmittance Value of API in Alkyl Polyglycoside.

1.0% w/w solution of alkyl polyglycoside was prepared by dissolving in de-ionised water using a 5 decimal point balance. The solutions were placed on a Stuart Roller Mix to mix the solution, without causing an excess of foam for approximately 15 minutes. To assess the transmittance of the alkyl polyglycosidet/API solution, approximately 10 mg of API was added to a centrifuge tube with 2.0 ml alkyl polyglycoside solution. After vortexing to produce a coarse suspension of the API, centrifuge tubes were placed on a rotating mixer set to 4 rpm, and samples were allowed to equilibrate over a period of 48 hours at a temperature of 25° C. Periodic visual assessment of the samples determined whether additional API was required, or whether insoluble API remained at the end of 48 hours, indicating saturation of the surfactant solution with the API. The samples were then centrifuged (5 minutes at 10,000 rpm) to sediment any excess API, before centrifuging again through a centrifuge filter to ensure that the samples contained no particulate material. The samples were transferred into a disposable 1.6 ml polystyrene micro-cuvette and measurements carried out on a Jenway Spectrophotometer 6300 at wavelength of 400 nm. Before each measurement the machine was calibrated relative to de-ionised water using the in-built calibration method.

5) Chemical Stability of Budesonide in Alkyl Polyglycoside.

a) Suspension Preparation.

A buffer solution was prepared containing 5 mg ml$^{-1}$ sodium benzoate, 2.5 mg ml$^{-1}$ sodium citrate, 1.4 mg ml$^{-1}$ citric acid, 42.5 mg ml$^{-1}$ NaCl, and 0.5 mg ml$^{-1}$ EDTA in purified water. 100 mg of alkyl polyglycoside was dissolved in 200 ml purified water with stirring. 62.5 mg of Budesonide was added and the system homogenised for 3-4 minutes with an Ultra Turrax high shear mixing device. 100 ml of the buffer solution was added to the system under stirring for a few minutes at 200 rpm. The suspension was transferred quantitatively to a 500 ml volumetric flask and filled with purified water to produce a concentration of budesonide of 0.125 mg ml$^{-1}$. 10 ml aliquots were transferred into 14 ml vials which were capped and further sealed with parafilm.

b) Solution Preparation.

1% solutions of alkyl polyglycoside were prepared in the same buffer solution as in 5a) above. Budesonide was added to each alkyl polyglycoside solution to give a concentration of 0.150 mg ml$^{-1}$ (based upon the solubility study carried out). These were mixed for a short period and ensure that all the budesonide was in solution. 2 ml of each stock solution was dispensed into HPLC vials.

c) Stability Measurement.

The solution and suspension samples were stored for 6 months, analyzing at 0, 1, 2, 3 and 6 months. The samples were stored in 25° C., 40° C. and 60° C. incubators. For each time point and temperature, the samples were analysed using Agilent 1260 Infinity II HPLC with diode array detector applying the same chromatographic method as described in 3) above for budesonide. API recovery was measured as a percentage of the initial concentration by summing the budesonide epimer peak areas. Additionally, the concentration of the two main degradation products budesonide, namely 21-dehydrobudesonide and 17α-carboxylic acid were quantified by producing standard curves in a similar method to that described in 3) above.

6) Chemical Stability of Insulin in Alkyl Polyglycoside.

a) Solution Preparation.

A 1 litre stock solution of citrate buffer at pH 7.0 was prepared by dissolving 1.2 g of citric acid, 1.0 g of EDTA and 1.0 g of sodium hydroxide in water. The stock solution was split in two halves, and pH adjusted to 6.8 and 7.4 by addition of 0.1 M citric acid solution and 0.1 M sodium hydroxide, respectively. Buffered alkyl polyglycoside solutions were prepared by dissolving 140 mg of alkyl polyglycoside in 100 ml of the two different pH citrate buffers. 4 mg ml$^{-1}$ insulin stock solutions were prepared by dissolving the appropriate amount of insulin in the two different citrate buffers (pH 6.8 and 7.4). Samples for the stability measurement were prepared by mixing 2 ml of insulin solution with 14 ml of the appropriate buffered alkyl polyglycoside solution, resulting in solutions containing 0.5 mg ml$^{-1}$ of insulin, 1.225 mg ml$^{-1}$ of alkyl polyglycoside and 1.1 mg ml$^{-1}$ of EDTA in citrate buffer at pH 6.8 and pH 7.4. 1 mg ml$^{-1}$ of methyl paraben was added to each sample as an antimicrobial preservative.

b) Preparing Standard Curve.

A stock solution was prepared with approximately 20 mg insulin dissolved in 10 ml of mobile phase in a glass vial. The masses of both were recorded on a 5 decimal point balance. An appropriate volume of stock solution and mobile phase were pipetted to give a range of calibration standards, across the concentration range 2.0, 1.0, 0.5, 0.25, 0.1, 0.05, 0.01 and 0.005 mg ml$^{-1}$. All masses were accurately recorded, to give concentrations in mg g$^{-1}$.

c) Stability Measurement.

Samples were stored for 12 weeks, analyzing at 0, 1, 2, 4, 5, 8, 10 and 12 weeks. The samples were stored in 25° C. and 40° C. incubators, and a further set were agitated by placing samples on a Stuart Rotary Mixing Wheel, which rotated at a speed setting of 3 in a 25° C. incubator. For each time point and temperature, the samples were analysed using Agilent 1260 Infinity II HPLC with diode array detector. The insulin recovery was measured as a percentage of the initial concentration using the peak area and a standard curve.

d) HPLC Conditions.

| | |
|---|---|
| HPLC column | AdvanceBio SEC, 120 Å, 1.9 μm, 4.6 × 300 mm |
| Mobile phase | 65% L-arginine solution (10 g l$^{-1}$), 15% acetic acid, 20% acetonitrile |
| Column temperature | 25° C. |
| Flow rate | 0.3 ml min$^{-1}$ |
| Injection volume | 5 μl |
| Run time | 30 mins |
| Detection wavelength | 276 nm |

7) Emulsion Stability Using Alkyl Polyglycoside.

Emulsion samples were prepared by mixing hemp oil and water (1:1 volume ratio) at room temperature using 0.5 wt % of alkyl polyglycoside as emulsifier. The samples were left at room temperature and then assessed for phase separation over a period of 7 days.

EXAMPLES

Example 1

1 kg of waxy barley starch was weighed into a 10 litre reactor and dispersed in 3.7 kg of water at 25° C. by means of gentle stirring. 25 ml of *Thermoanaerobacter* sp CGTase enzyme preparation was added (equivalent to 15 KNU-CP per kg of reaction mixture) and the temperature increased to 72° C. in order to pre-hydrolyse the starch. When the temperature reached 72° C. (after 1.5 hours), 230 ml of a 154 g l$^{-1}$ solution of cetearyl glucoside was added. The temperature was reduced to 63° C. and the reaction allowed to proceed at constant temperature for 5.5 hours. The enzyme was then inactivated by increasing the temperature to 91° C. and maintaining for 4.5 hours. The reaction mixture was then cooled to 20° C.

Purification of the crude reaction mixture containing the alkyl polyglycoside intermediate was performed by flash chromatography, using a Biotage Isolera LS instrument. Prior to loading onto the column, the crude reaction mixture was pre-treated to remove excess oligosaccharides. 1 litre of the reaction mixture was initially heated to approximately 40° C., at which point it became visually clear. 1 litre of ethanol was slowly added, resulting in precipitation. The precipitate was separated from the supernatant by decanting, yielding 1.7 litres of supernatant. The supernatant was re-heated to approximately 40° C. and diluted with water to a final solvent composition of 20% ethanol, giving a total volume of 4.25 litres. This solution was loaded onto a 120 gram C8 flash column supplied by Acros Chemicals and elution effected using an ethanol:water gradient running from 20% to 100% of ethanol. Fractions 3 through 17 (corresponding to an eluent composition of 20-35%) were collected, pooled and concentrated on a rotavapor. Finally, the concentrate was freeze-dried, yielding alkyl polyglycoside product as a free-flowing white powder.

The alkyl polyglucoside intermediate and alkyl polyglucoside product were subjected to the test procedures described herein, and exhibited the following properties;

a) Alkyl Polyglucoside Intermediate:
   i) DP1=0.23 mole fraction.
   ii) DP2=0.16 mole fraction
   iii) DP3=0.13 mole fraction.
   iv) DP4=0.12 mole fraction
   v) DP4 to DP10=0.40 mole fraction.
   vi) Mean DP=3.7 glucose units.
   vii) Increase in mean DP (over starting material)=2.6 glucose units.
   viii) Glucose conversion=4.6 wt %.
   ix) Transmittance=22.9%.
   x) API Solubility:
      Budesonide=0.272%.
      Progesterone=0.178%.
   xi) API Transmittance:
      Budesonide=18.7%.
      Progesterone=19.8%.
      Dexamethasone=17.1%.
   xii) Insulin Stability:
      Recovery after 12 weeks.

| No Agitation | | | | With Agitation | |
|---|---|---|---|---|---|
| 25° C. pH 6.8 | 25° C. pH 7.4 | 40° C. pH 6.8 | 40° C. pH 7.4 | 25° C. pH 6.8 | 25° C. pH 7.4 |
| 61.0% | 70.9% | 23.2% | 73.9% | 32.2% | 26.7% | b) Alkyl Polyglucoside Product:
   i) DP1=0.02 mole fraction.
   ii) DP2=0.01 mole fraction.
   iii) DP3=0.11 mole fraction.
   iv) DP4=0.21 mole fraction.
   v) DP4 to DP10=0.83 mole fraction.
   vi) DP11 to DP15=0.03 mole fraction.
   vii) Mean DP=5.6 glucose units.
   viii) Increase in mean DP (over intermediate)=1.9 glucose units.
   ix) Transmittance=96.8%.
   x) API Solubility:
      Budesonide=0.395%.
      Progesterone=0.260%.
   xi) API Transmittance:
      Budesonide=77.9%.
      Progesterone=87.9%.
      Dexamethasone=84.3%.
   xii) API Recovery at 60° C. for 3 months:
      Budesonide in Suspension=98.5%.
      Budesonide in Solution=95.8%.
   xiii) Insulin Stability:
      Recovery after 12 weeks.

| No Agitation | | | | With Agitation | |
|---|---|---|---|---|---|
| 25° C. pH 6.8 | 25° C. pH 7.4 | 40° C. pH 6.8 | 40° C. pH 7.4 | 25° C. pH 6.8 | 25° C. pH 7.4 |
| 90.9% | 91.4% | 67.8% | 83.7% | 75.3% | 75.3% |

For comparison purposes, polysorbate 80 was also subjected to some of the test procedures described herein, and exhibited the following properties;
   i) API Solubility:
      Budesonide=0.195%.
      Progesterone=0.083%.
   ii) API Recovery at 60° C. for 3 months:
      Budesonide in Suspension=96.9%.
      Budesonide in Solution=85.9%.
   iii) Insulin Stability:
      Recovery after 12 weeks.

| No Agitation | | | | With Agitation | |
|---|---|---|---|---|---|
| 25° C. pH 6.8 | 25° C. pH 7.4 | 40° C. pH 6.8 | 40° C. pH 7.4 | 25° C. pH 6.8 | 25° C. pH 7.4 |
| 72.9% | 86.4% | 19.9% | 47.7% | 43.6% | 57.5% |

Example 2

317 kg of water was charged into a 1,000 litre reactor. 80 kg of potato maltodextrin (DE=1) and 2.9 kg of cetearyl glucoside were added to the reactor at ambient temperature under stirring. The temperature of the reactor was increased to 65° C. under continuous stirring. After reaching the target temperature, 0.2 kg of *Thermoanaerobacter* sp. CGTase enzyme preparation was added (equivalent to 1.5 KNU-CP per kg of reaction mixture) and the reaction allowed to proceed for 24 hours. The reaction was stopped by heating the reaction mixture to 95° C. and maintaining for 2.5 hours. The solution was then cooled to 30° C. and preservative was added. Finally, the reaction mixture was cooled to ambient temperature. The crude reaction mixture containing the alkyl polyglucoside intermediate was then purified as described in Example 1 to produce the alkyl polyglucoside product. In addition, Fractions 20 through 40 (corresponding to an eluent composition of 50-70%) were collected, pooled and concentrated on a rotavapor. This concentrate was freeze-dried, yielding alkyl glycoside side-product as a free-flowing white powder.

The alkyl polyglucoside intermediate, alkyl polyglucoside product and alky polyglucoside side-product were subjected to the test procedures described herein, and exhibited the following properties;

a) Alkyl Polyglucoside Intermediate:
   i) DP1=0.22 mole fraction.
   ii) DP2=0.17 mole fraction.
   iii) DP3=0.14 mole fraction.
   iv) DP4=0.12 mole fraction.
   v) DP4 to DP10=0.40 mole fraction.
   vi) Mean DP=4.3 glucose units.
   vii) Increase in mean DP (over starting material)=3.2 glucose units.
   viii) Glucose conversion=4.8 wt %.

b) Alkyl Polyglucoside Product:
   i) DP1=0.000 mole fraction.
   ii) DP2=0.001 mole fraction.
   iii) DP3=0.17 mole fraction.
   iv) DP4=0.24 mole fraction.
   v) DP4 to DP10=0.79 mole fraction.
   vi) DP11 to DP15=0.04 mole fraction.
   vii) Mean DP=5.3 glucose units.
   viii) Increase in mean DP (over intermediate)=1.0 glucose units.

c) Alkyl Polyglucoside Side-Product:
   i) DP1=0.49 mole fraction.
   ii) DP2=0.32 mole fraction.
   iii) DP3=0.10 mole fraction.
   iv) DP4=0.05 mole fraction.
   v) DP5 to DP15=0.04 mole fraction.
   vi) Mean DP=1.9 glucose units.
   vii) No phase separation in the emulsion stability test (phase separation occurred overnight using 0.5 wt % cetearyl glucoside as emulsifier).

Example 3

8.041 kg of water was charged into a 10 litre reactor. 0.2205 kg of cetearyl glucoside and 1.733 kg of β-cyclodextrin undecahydrate were added to the reactor at 75° C., left stirring overnight, and then 6 ml of *Thermoanaerobacter* sp CGTase enzyme preparation was added (equivalent to 1.8 KNU-CP per kg of reaction mixture). The reaction was allowed to proceed for 28 hours and the enzyme was then inactivated by increasing the temperature to 98° C. and maintaining for 3 hours. The reaction mixture was then cooled to 60° C. and diluted to 50% with 99.9% ethanol for storage.

Purification of the crude reaction mixture containing the alkyl polyglycoside intermediate was performed by flash chromatography, using a Biotage Isolera LS instrument. Prior to loading onto the column, 340 ml crude reaction mixture was diluted to 20% ethanol in 1 litre volume by addition of Milli-Q water and 99.9% ethanol. The mixture was heated to approximately 70° C., at which point it became visually clear. This solution was loaded onto a 120 gram C8 flash column supplied by Acros Chemicals and elution effected using an ethanol:water gradient running from 20% to 100% of ethanol. Fractions 4 through 17 (corresponding to an eluent composition of 20-35%) were collected, pooled and concentrated on a rotavapor. Finally, the concentrate was freeze-dried, yielding alkyl polyglycoside product as a free-flowing white powder.

The alkyl polyglucoside intermediate and alkyl polyglucoside product were subjected to the test procedures described herein, and exhibited the following properties;
a) Alkyl Polyglucoside Intermediate:
   i) DP1=0.30 mole fraction.
   ii) DP2=0.17 mole fraction
   iii) DP3=0.10 mole fraction.
   iv) DP4=0.11 mole fraction
   v) DP4 to DP10=0.41 mole fraction.
   vi) Mean DP=3.7 glucose units.
   vii) Increase in mean DP (over starting material)=2.7 glucose units.
   viii) Glucose conversion=15.7 wt %.
b) Alkyl Polyglucoside Product:
   i) DP1=0.00 mole fraction.
   ii) DP2=0.01 mole fraction.
   iii) DP3=0.14 mole fraction.
   iv) DP4=0.22 mole fraction.
   v) DP4 to DP10=0.82 mole fraction.
   vi) DP11 to DP15=0.03 mole fraction.
   vii) Mean DP=5.7 glucose units.
   viii) Increase in mean DP (over intermediate)=2.0 glucose units.
   ix) Transmittance=96.7%.

The above examples illustrate the improved properties of the alkyl polyglucoside product, alkyl polyglucoside side-product, and uses thereof according to the present invention.

The invention claimed is:

1. An alkyl polyglycoside composition comprising C16 alkyl polyglycosides and/or C18 alkyl polyglycosides wherein the mole-average degree of polymerization (mean DP) of the glycoside chains is greater than or equal to 3.0 units, the molar concentration of alkyl triglycoside (DP3) is greater than alkyl monoglycoside (DP1), and the alkyl polyglycoside composition has a transmittance value at 400 nm of greater than 85.0% at a concentration of 1.0 wt % in an aqueous solution.

2. The composition according to claim 1 comprising 0.05 to 0.3 mole fraction of DP3 and/or the DP3:DP1 molar ratio is greater than 2.0:1.0.

3. The composition according to claim 1, further comprising an alkyl tetraglycoside (DP4), wherein the composition has an alkyl triglycoside:alkyl tetraglycoside (DP3: DP4) molar ratio of 0.2 to 2.0:1.0.

4. The composition according to claim 1 wherein the mean DP is 4.5 to 7.0.

5. A pharmaceutical composition comprising (i) 0.001 to 10.0 wt %, of at least one active pharmaceutical ingredient (API), (ii) 0.01 to 75.0 wt % of an alkyl polyglycoside comprising C16 alkyl polyglycosides and/or C18 alkyl polyglycosides wherein the mole-average degree of polymerization (mean DP) of the glycoside chains is greater than or equal to 3.0 units and the molar concentration of an alkyl triglycoside (DP3) is greater than an alkyl monoglycoside (DP1), and (iii) 15.0 to 99.99 wt % of water, wherein the pharmaceutical composition has an API recovery of greater than 87%.

* * * * *